(12) United States Patent
Jiang et al.

(10) Patent No.: US 11,181,400 B2
(45) Date of Patent: Nov. 23, 2021

(54) FIBER BRAGG GRATING DEMODULATION DEVICE CAPABLE OF SUPRESSING FLUCTUATIONS AT VARIABLE AMBIENT TEMPERATURE AND DEMODULATION METHOD THEREOF

(71) Applicant: Tianjin University, Tianjin (CN)

(72) Inventors: Junfeng Jiang, Tianjin (CN); Tiegen Liu, Tianjin (CN); Jinling Yan, Tianjin (CN); Kun Liu, Tianjin (CN); Shuang Wang, Tianjin (CN); Xuezhi Zhang, Tianjin (CN); Chuanjun Zang, Tianjin (CN); Renwei Xie, Tianjin (CN); Qiliang Chu, Tianjin (CN)

(73) Assignee: Tianjin University, Tianjin (CN)

( * ) Notice: Subject to any disclaimer, the term of this patent is extended or adjusted under 35 U.S.C. 154(b) by 4 days.

(21) Appl. No.: 16/324,275

(22) PCT Filed: Oct. 27, 2016

(86) PCT No.: PCT/CN2016/103525
§ 371 (c)(1),
(2) Date: Feb. 8, 2019

(87) PCT Pub. No.: WO2018/028051
PCT Pub. Date: Feb. 15, 2018

(65) Prior Publication Data
US 2019/0178688 A1  Jun. 13, 2019

(30) Foreign Application Priority Data
Aug. 11, 2016  (CN) .......................... 201610668091.5

(51) Int. Cl.
*G01D 5/353* (2006.01)
*G01D 3/028* (2006.01)
*G01D 18/00* (2006.01)

(52) U.S. Cl.
CPC ......... *G01D 5/35316* (2013.01); *G01D 3/028* (2013.01); *G01D 5/35312* (2013.01);
(Continued)

(58) Field of Classification Search
CPC ........... G01D 5/35312; G01D 5/35316; G01D 18/00; G01D 3/028; G01D 5/353; G01D 5/35325; G01D 5/35335
See application file for complete search history.

(56) References Cited

U.S. PATENT DOCUMENTS 5,696,579 A * 12/1997 Johnson ............. G01D 5/35383
356/35.5
8,909,040 B1 * 12/2014 Parker, Jr. ................ G02B 6/35
398/25

(Continued)

FOREIGN PATENT DOCUMENTS

CN          104931081 A  *  9/2015

*Primary Examiner* — Violeta A Prieto
(74) *Attorney, Agent, or Firm* — George G. Wang; Bei & Ocean

(57) ABSTRACT

The present invention discloses a Fiber Bragg Grating demodulation device with a suppressed fluctuation at a variable ambient temperature and a demodulation method. The device comprises a broadband light source (1), an optical attenuator (2), a tunable F-P filter (3), a first optical fiber isolator (41), an erbium-doped optical fiber amplifier (5), an optical fiber first-stage beam splitter (6), a first optical fiber second-stage beam splitter (71), optical fiber circulators (8), FBG sensor arrays (9), a first photoelectric detector array (161), an optical fiber gas cell (10), a second optical fiber second-stage beam splitter (72), an optical fiber F-P etalon (11), a notch filter (12), an optical fiber assisted interferometer (13), a data acquisition card (17) and a processor (18).

1 Claim, 5 Drawing Sheets

(52) U.S. Cl.
CPC ..... *G01D 5/35325* (2013.01); *G01D 5/35335* (2013.01); *G01D 18/00* (2013.01)

(56) References Cited

U.S. PATENT DOCUMENTS

| | | | |
|---|---|---|---|
| 9,322,740 B2* | 4/2016 | Liu .................... | G01D 5/35354 |
| 2003/0169486 A1* | 9/2003 | Arbore ................ | H01S 3/06758 |
| | | | 359/341.3 |
| 2012/0183004 A1* | 7/2012 | Kupershmidt ........ | H01S 5/0687 |
| | | | 372/29.011 |
| 2014/0176937 A1* | 6/2014 | Liu .................... | G01D 5/35329 |
| | | | 356/73.1 |

* cited by examiner

FIBER BRAGG GRATING DEMODULATION DEVICE CAPABLE OF SUPRESSING FLUCTUATIONS AT VARIABLE AMBIENT TEMPERATURE AND DEMODULATION METHOD THEREOF

FIELD OF THE INVENTION

The present invention belongs to the technical field of optical fiber sensing, and particularly relates to a high-stability Fiber Bragg Grating demodulation device and demodulation method based on an optical fiber assisted interferometer in a variable temperature environment.

BACKGROUND OF THE INVENTION

A Fiber Bragg Grating sensing system uses light as a carrier and an optical fiber as a transmission medium, has the advantages of small size, light weight, corrosion resistance, electromagnetic interference resistance, good wavelength selectivity, high reusability and the like, and is able to sense changes in physical parameters such as external stress-strain, vibration, temperature and pressure and then reflect the changes by the shift of the Bragg optical wavelength. Compared with conventional electrical sensing systems, this technology is characterized by wide measurement range, high accuracy and high resolution, and more advantageous in severe environments such as strong electromagnetic interference, inflammable and explosive environment or thermal vacuum.

The tunable F-P filter method is a common FBG demodulation method, which easily realizes high-speed and high-accuracy demodulation in a wide spectral range; however, since the tunable F-P filter realizes the wavelength scanning in a wide range by the inverse piezoelectric effect of a piezoelectric transducer (hereinafter referred to as PZT), the hysteresis, creep, nonlinearity and other characteristics of the PZT disenable the transmission wavelength and the driving voltage to have good linearity and repeatability, affecting the accuracy of demodulation. An F-P etalon can introduce, within a range matched with the light source band, a plurality of optical frequency reference points at uniform intervals and can well calibrate a wavelength-scanning nonlinear curve of the tunable filter at a stable ambient temperature; however, the F-P etalon has a wavelength shift at a different stable temperature. The reference wavelength of the F-P etalon is corrected by using the reference wavelength of the temperature-stable gas, so that the demodulation of the absolute wavelength at a different stable or quasi-stable ambient temperature is realized. However, when the ambient temperature changes rapidly, the PZT will increase the random fluctuation of the wavelength-scanning nonlinear curve of the filter. Particularly in the case of high and medium speed scanning, it is difficult to avoid the large fluctuation in the result of wavelength demodulation by the F-P etalon and the optical fiber gas cell, so that the accuracy of measurement is greatly reduced. To overcome this problem, a device for suppressing fluctuations in a wavelength-scanning nonlinear curve and a demodulation method are proposed in the present invention. By introducing an optical fiber assisted interferometer, the optical frequency between adjacent interference spectral lines of an F-P etalon are subdivided to obtain a plurality of additional local optical frequency references, so that the fluctuation in the result of demodulation caused by the increased fluctuation in the wavelength-scanning nonlinear curve of a tunable filter is effectively suppressed.

SUMMARY OF THE INVENTION

To overcome the stability influence of wavelength demodulation of a FBG sensor caused by a variable ambient temperature on the fluctuation in the wavelength-scanning nonlinear curve of a tunable F-P filter, the present invention provides a high-stability FBG demodulation device and demodulation method for suppressing fluctuations. The device realizes the subdivision of optical wavelength intervals of an F-P etalon by an assisted interferometer, and establishes a local optical frequency subdivision and demodulation algorithm, so that the large fluctuation in the filter grating relative to the wavelength modulated value during a temperature changing process is suppressed and the stability of wavelength demodulation is improved.

The present invention provides a FBG demodulation device for suppressing fluctuations at a variable ambient temperature, wherein the device includes a broadband light source 1, an optical attenuator 2, a tunable F-P filter 3, a first optical fiber isolator 41, an erbium-doped optical fiber amplifier 5, an optical fiber first-stage beam splitter 6, a first optical fiber second-stage beam splitter 71, optical fiber circulators 8, FBG sensor arrays 9, a first photoelectric detector array 161, an optical fiber gas cell 10, a second optical fiber second-stage beam splitter 72, an optical fiber F-P etalon 11, a notch filter 12, an optical fiber assisted interferometer 13 consisting of a second optical fiber isolator 42, an optical fiber coupler 14, Faraday polarizers 15 and a second photoelectric detector array 162, a data acquisition card 17 and a processor 18;

wherein light emitted from the broadband light source 1 is processed by the optical attenuator 2 to satisfy the optical power requirements at an entry of the tunable F-P filter 3 and then enters the tunable F-P filter 3 driven by a triangular-wave or sawtooth-wave voltage to output swept frequency lasers; the swept frequency lasers enter the erbium-doped optical fiber amplifier 5 for optical power amplification after passing through the first optical fiber isolator 41 and are then split into two paths of light by the optical fiber first-stage beam splitter 6; one path of light enters the first optical fiber second-stage beam splitter 71 and is then split into N beams; each of N−1 beams enters the respective FBG sensor array 9 through an optical fiber circulator 8 arranged in each path, the sensors sense changes of parameters to be measured during the ambient temperature changing process and then encode the signals to the central wavelength of the FBG reflected light, and the reflected light is transmitted to photoelectric detector arrays 16 by the optical fiber circulators 8; the remaining beam enters the optical fiber gas cell 10, and transmitted light is received by the photoelectric detector arrays 16; the other path of light is split into two beams by the second optical fiber first-stage beam splitter 72, where one beam enters the optical fiber F-P etalon 11 to form comb-like transmitted light having equal optical frequency intervals, a transmission peak of a specified central optical frequency is notched by a notch filter 12, and the optical frequency is marked and received by the photoelectric detector arrays 16, and the other beam enters the optical fiber assisted interferometer 13 and is then processed by the second optical fiber isolator 42, reflected light from two interference arms are reflected by the Faraday polarizers 15 and then form interference fringes at the optical fiber coupler 14; a plurality of additional local optical frequency references are inserted between adjacent transmission peaks of the optical fiber F-P etalon 11 so as to calibrate a wavelength-scanning nonlinear curve of the tunable F-P filter 3 by the interference fringes; interference light is received by the photoelectric detector arrays 16 which then convert all light signals into electrical signals, and the electrical signals are transmitted to the processor 18 through the data acquisition card 17 for purpose of demodulation.

The present invention further provides a FBG demodulation method for suppressing fluctuations at a variable ambient temperature, including the following steps:

step (1): performing optical attenuation and optical power tuning and filtering on input signals from a broadband light source to output narrow band swept frequency lasers, isolating and echoing the swept frequency lasers for optical power amplification, and splitting light into two paths of light, wherein one path of light reaches a sensor link and an optical fiber gas cell and the other path of light reaches additional local optical frequency of another link for reference;

step (2): splitting the light in the sensor link and the optical fiber gas cell into N beams, where one beam is converted into analog voltage signals from transmitted light signals, and each of the remaining N−1 beams is transmitted to the sensor link; measuring external parameters to be measured by sensors, and encoding them to the central wavelength of the FBG reflected light; and, converting the reflected light signals in the sensor link into analog voltage signals;

step (3): splitting the light reaching the additional local optical frequency of another link for reference into two paths of light; allowing one path of light to form comb-like transmitted light, notching a specified optical frequency of the transmitted light signals and marking the specified optical frequency; splitting and reflecting the other path of light, allowing the light to encounter and interfere to obtain assisted interference signals; converting the two path of light signals into analog voltage signals, and transmitting the analog voltage signals to a processing unit through a data acquisition card for purpose of demodulation;

step (4): performing peak detection on the acquired comb-like transmitted light spectral line, taking specified optical frequency mark as a reference to detect respective peak points $X_i$ at two sides successively, performing one-to-one correspondence to the peak points $X_i$ with the known optical frequency values $F_i$, to obtain primary optical frequency reference points $(X_i, F_i)$ in the spectral wide range of the light source so as to from a primary optical frequency reference point sequence, where i=1, 2, 3 ... n−1; based on the primary optical frequency reference point sequence, dividing the whole spectral range of the broadband light source into n regions ($E_i$=1, 2, 3 ... n−1), and using a starting point and an ending point of each region as two adjacent primary optical frequency reference points $(X_i, F_i)$ and $(X_{i+1}, F_{i+1})$;

step (5): removing the baseline from the acquired interference signal spectral line, intercepting assisted interference signals in a region $E_i$ having an x-coordinate range $X_i$ of to $X_{i+1}$, obtaining the position of peaks and troughs of the assisted interference signals by an extremum method, a centroid method or a fitting method to form a sampling points sequence $(X_1, \ldots X_{m-1})$ of secondary optical frequency references, and counting the number of peaks and troughs to obtain the number m of complete half periods, determining the number of incomplete half periods close to the starting point and ending point of the region by calculating the percentage of incomplete half periods in the half periods, and eventually obtaining the number of half periods of interference signals in the region:

$$n_{T/2} = \frac{\Delta n_s}{N_s/2} + \frac{\Delta n_e}{N_e/2} + m$$

where $\Delta n_s$ is the sampling point spacing between the first peak or trough point in the region and the starting point $X_i$ of the region, $N_s/2$ is the number of sampling points in an interference half period of $X_i$, $\Delta n_e$ is the sampling points spacing between the last peak or trough points in the region and the ending point $X_{i+1}$ of the region, and $N_e/2$ is the number of sampling points in an interference half period of $X_{i+1}$, so that the optical frequency value $f_k$ (where k=1, 2, 3 ... m+1) of the secondary optical frequency reference points is:

$$\begin{cases} f_1 = F_i + \frac{F_{i+1} - F_i}{n_{T/2}} \cdot \frac{\Delta n_s}{N_s/2} \\ f_k = f_{k-1} + \frac{F_{i+1} - F_i}{n_{T/2}}, \quad 2 \le k \le m; \\ f_{m+1} = f_m + \frac{F_{i+1} - F_i}{n_{T/2}} \cdot \frac{\Delta n_e}{N_e/2} \end{cases}$$

by using a sequence formed by the primary optical frequency reference points $(X_i, F_i)$ and the secondary optical frequency reference points $(x_k, f_k)$, establishing a sampling point-optical frequency curve in the region $E_i$ by interpolation, where $f_1$ and $f_{m+1}$ represent optical frequency values of the secondary optical frequency reference point when k=1 and k=m+1, respectively;

step (6): by performing peak detection on the reflected light signals from the sensor link, positioning the peak positions into a specified region divided by adjacent light signal spectral lines, obtaining a central optical frequency $f_{fbg}$ of transmission peaks of FBG sensors by interpolation based on the sampling point-optical frequency curve, and obtaining a peak central wavelength $\lambda_{fbg}=c/f_{fbg}$ of the FBG sensors by a relationship $\lambda=c/f$ (where c is the velocity of light in vacuum) between the frequency f and the wavelength $\lambda$; and step (7): extracting the maximum absorption peak of the transmission spectral line of the optical fiber gas cell, removing the baseline and detecting peaks to obtain peak positions, positioning the peaks into a specified region divided by adjacent transmission spectral lines, obtaining a central optical frequency $f_g$ of the maximum absorption peak by interpolation based on the sampling point-optical frequency curve, obtaining a peak central wavelength $\lambda_g$ by a relationship

in which: 1: broadband light source; 2: optical attenuator; 3: tunable F-P filter; 41: first optical fiber isolator; 5: erbium-doped optical fiber amplifier; 6: optical fiber first-stage beam splitter; 71: first optical fiber second-stage beam splitter; 72: second optical fiber second-stage beam splitter; 8: optical fiber circulators; 9: FBG sensor array; 10: optical fiber gas cell; 11: optical fiber F-P etalon; 12: notch filter; 13: optical fiber assisted interferometer; 42: second optical fiber isolator; 14: optical fiber coupler; 15: Faraday polarizer; 16: photoelectric detector array; 17: data acquisition card; 18: processor; 19: etalon transmission peak; and, 20: FBG transmission signal.

DETAILED DESCRIPTION OF THE INVENTION WITH EMBODIMENTS

The technical solutions of the present invention will be specifiedally described below by embodiments with reference to the accompanying drawings.

Embodiment 1

Figure 1:
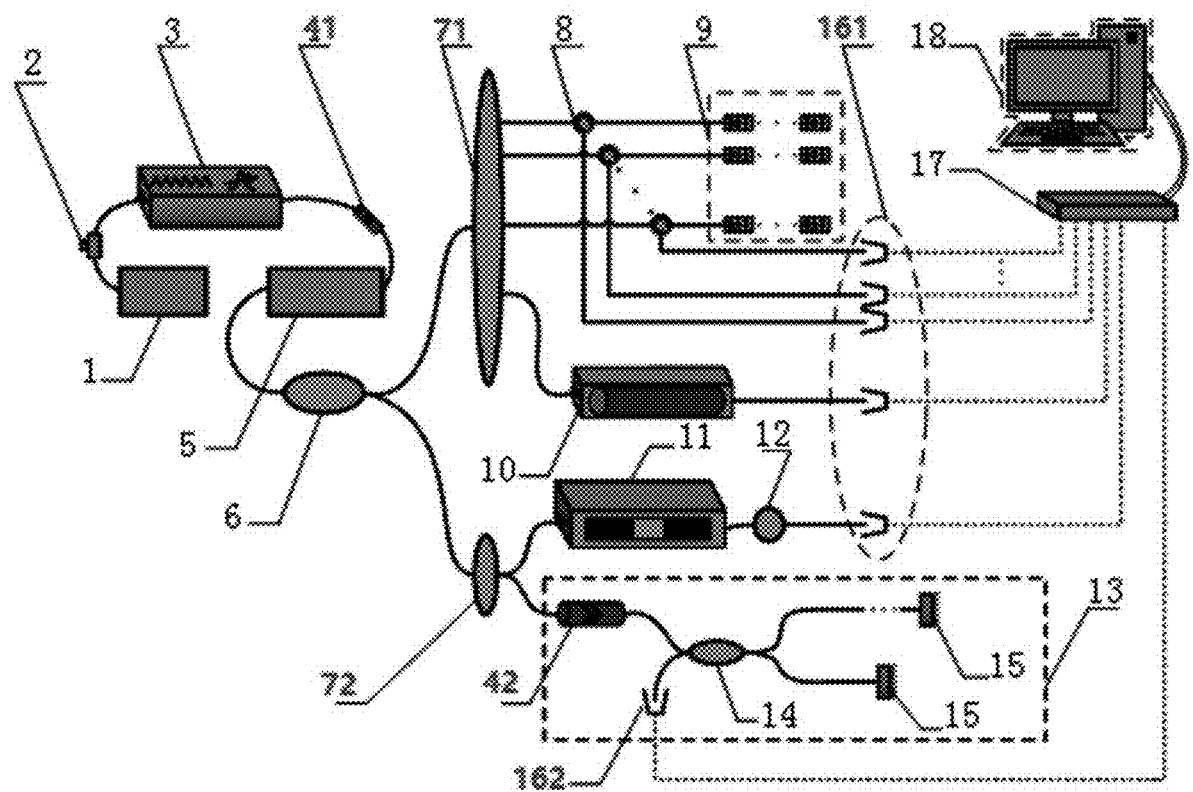
FIG. 1 is a schematic diagram of a FBG demodulation device for suppressing fluctuations at a variable ambient temperature.

FBG Demodulation Device for Suppressing Fluctuations at Variable Ambient Temperature As shown in FIG. 1, light emitted from a broadband light source 1 is processed by an optical attenuator 2 to satisfy the optical power requirements at an entry of a tunable F-P filter 3 and then enters the tunable F-P filter 3 driven by a triangular-wave or sawtooth-wave voltage to output swept frequency lasers; the swept frequency lasers enter an erbium-doped optical fiber amplifier 5 for optical power simplification after passing through a first optical fiber isolator 41 and are then split into two paths of light at a ratio of 20%:80% by an optical fiber first-stage beam splitter 6; 80% of light enters a first optical fiber second-stage beam splitter 71 and is then split into 8 beams; each of 7 beams enters a respective FBG sensor array 9 through an optical fiber circulator 8 arranged in each path, changes of parameters to be measured during the ambient temperature changing process are sensed by sensors and result in a central wavelength shift of the FBG reflected light, and the reflected light is transmitted to photoelectric detector arrays 16 by the optical fiber circulators 8; the remaining beam enters an optical fiber gas cell 10, and transmitted light is received by the photoelectric detector arrays 16; the other 20% of light is split into two beams by a second optical fiber first-stage beam splitter 72, where one beam enters an optical fiber F-P etalon 11 to form comb-like transmitted light having equal optical frequency intervals, a transmission peak of a specified central optical frequency is notched by a notch filter 12, and the optical frequency is marked and received by the photoelectric detector arrays 16; and the other beam enters an optical fiber assisted interferometer 13 and is then processed by a second optical fiber isolator 42, reflected light from two interference arms are reflected by the Faraday polarizer 15 and then form interference fringes at the optical fiber coupler 14; a plurality of additional local optical frequency references are inserted between adjacent transmission peaks of the optical fiber F-P etalon 11 so as to calibrate a wavelength-scanning nonlinear curve of the tunable F-P filter 3 by the interference fringes; interference light is received by the photoelectric detector arrays 16 which then convert all light signals into electrical signals, and the electrical signals are transmitted to a processor 18 through a data acquisition card 17 for purpose of demodulation.

The broadband light source 1 is configured to provide broadband light, including a C-band ASE light source, a C+L band ASE light source and an SLD light source, with a power within the range from 0.1 mW to 40 mW.

The optical attenuator 2 is configured to adjust the output optical power of the light source so as to satisfy the restriction requirements for the optical power at the entry of the tunable F-P filter.

The tunable F-P filter 3 is configured to filter out wavelength-changing narrowband spectral signals from the broadband light source by controlling the driving voltage, so as to realize wavelength scanning. The spectral width of the tunable F-P filter is within the range from 10 pm to 400 pm, and the free spectral range is 90 nm to 200 nm.

The first and second optical fiber isolators 41, 42 are used for isolation echoing so as to ensure the unidirectional transmission of light.

The erbium-doped optical fiber amplifier 5 is configured to amplify the scanning light, and has an output optical power range of 10 dBm to 18 dBm.

The optical fiber first-stage beam splitter 6 is configured to split the input light at a certain ratio, including a planar waveguide optical fiber beam splitter and a fused biconical taper optical fiber beam splitter.

The optical fiber second-stage beam splitter 7 is configured to split the output tunable laser into N beams of scanning laser having the same power and spectral pattern, where the value of N is one selected from 2, 4, 8, 16, 32, 64 and 128.

The optical fiber circulator 8 is configured to transmit the light from the optical fiber second-stage beam splitter to the sensor link and acquire reflected signal light. When the power of the light source is greater than 1 mW, the optical fiber circulator may be replaced with an optical fiber coupler in order to reduce the system cost.

The FBG sensor array 9 is configured to sense a change of an external physical quantity to be measured so as to shift the wavelength in the FBG reflection spectrum.

The optical fiber gas cell 10 is configured to provide an absolute optical frequency reference standard, including an acetylene gas cell, a methane gas cell, a hydrogen cyanide gas cell and a carbon dioxide gas cell.

The optical fiber F-P etalon 11 is configured to provide comb-line wavelength references having equal optical frequency intervals.

The notch filter 12 is configured to remove a spectral line of the optical fiber F-P etalon 11.

The optical fiber assisted interferometer 13 is configured to provide additional optical frequency references between adjacent maximum transmission values of the optical fiber F-P etalon 11 and to calibrate a wavelength-scanning nonlinear curve of the tunable F-P filter during the ambient temperature changing process. The structure includes an optical fiber Michelson interferometer and an optical fiber Mach-Zehnder interferometer. The optical fiber Michelson interferometer consists of an optical fiber coupler 14 and an optical fiber Faraday polarizer 15, wherein the optical fiber coupler 14 uniformly splits the input light into two paths to obtain two light beams having the same direction of vibration and the same frequency and then transmit the two light beams to the optical fiber Faraday polarizer 15, and the optical fiber Faraday polarizer 15 reflects light of two interference arms to form two interference arms having a certain optical path difference. The optical fiber Mach-Zehnder interferometer consists of two optical fiber couplers connected in series. Since the optical path difference between two arms has an allowable maximum value due to the wide spectrum of the scanning light source, during the determination of the difference in geometrical length between two arms, an interaction effect of the optical path difference on the number of interference fringes and the fringe visibility should be comprehensively considered.

The photoelectric detector arrays 16 are configured to convert light signals in a sensing channel and a reference channel into analog voltage signals.

The data acquisition card 17 acquires the analog voltage signals obtained by the photoelectric detector arrays.

The processing unit 18 is a computer or an embedded computing system configured to demodulate the sensed FBG wavelength.

Embodiment 2

Extraction and Demodulation Method for Additional Local Optical Frequency References Based on the Optical Fiber Assisted Interferometer and the Optical Fiber F-P Etalon Processing the light emitted from the broadband light source by the optical attenuator to satisfy the optical power requirements at an entry of the tunable F-P filter; entering into the tunable F-P filter drove by a triangular-wave or sawtooth-wave voltage to output narrowband swept lasers; and, performing optical power amplification to the lasers by the erbium-doped optical fiber amplifier after passing through the optical fiber isolator, and then entering the optical fiber first-stage beam splitter to split into two paths of light; allowing one path of light reaching the sensor link and the optical fiber gas cell, and allowing the other path of light reaching additional local optical frequency of another link for reference;

receiving the light from the sensor link and the optical fiber gas cell to the optical fiber second-stage beam splitter and splitting the light into N beams, where allowing one beam entering the optical fiber gas cell, and transmitting transmitted light signals to photoelectrical detectors; and converting each of the remaining beams into swept laser by an optical fiber circulator and then transmitting the laser to the FBG sensor array, and then sensing, by the sensors, changes of external quantities to be measured so as to shift the central wavelength of the FBG inverse spectrum, and transmitting the reflected light signals to the photoelectrical detectors through the optical fiber circulators;

splitting the light reaching the additional local optical frequency of another link for reference into two paths of light by the optical fiber second-stage beam splitter; allowing one path of light entering into the optical fiber F-P etalon to form comb-like transmitted light having equal optical frequency intervals; notching light signals at a specified optical frequency by a notch filter and marking the optical frequency thereof; allowing other path of light entering into the optical fiber assisted interferometer to form reflected light at two arms, and then entering into the optical fiber coupler to form interference light; transmitting two paths of wavelength reference light signals to the photoelectrical detectors, and converting all light signals into electrical signals by the photoelectrical detector array, and transmitting the electrical signals to the processing unit through the data acquisition card for purpose of demodulation;

providing wavelength reference spectral lines having equal optical frequency intervals by the optical fiber F-P etalon, detecting peaks from the acquired etalon signals and then in one-to-one correspondence to the known optical frequency values by the optical frequency marker to obtain primary optical frequency reference points in the spectral width range of the light source; based on the primary optical frequency reference point sequence, dividing the whole spectral range of the broadband light source into a plurality of regions ($E_i$=1, 2, 3 ... n−1), where determining a starting point and an ending point of each region by two adjacent peak points ($X_i, F_i$) and ($X_{i+1}, F_{i+1}$) of the transmission spectrum of the optical fiber F-P etalon;

Removing the baseline from the acquired signal spectral line of the optical fiber assisted interferometer, processing assisted interference signals in a region $E_i$ determined by the optical fiber F-P etalon, and determining the positions of peaks and troughs by a centroid method, a trigonometric function fitting method and a derivation method to obtain positions as a sampling point ($X_1, \ldots X_{m-1}$) sequence of secondary optical frequency references, and obtaining the number m of complete half periods by counting the number of peak points and trough points; the number of incomplete half periods close to the starting point and the ending point of the region is determined by calculating the percentage of incomplete half periods in the half periods; thus, obtaining the number of half periods of interference signals in the region as:

$$n_{T/2} = \frac{\Delta n_s}{N_s/2} + \frac{\Delta n_e}{N_e/2} + m,$$

where $\Delta n_s$ is the sampling point spacing between the first peak (trough) point in the region and the starting point $X_i$ of the region, and $N_s/2$ is the number of sampling points in an interference half period of $X_i$, $\Delta n_e$ is the sampling point spacing between the last peak (trough) point in the region and the ending point $X_{i+1}$ of the region, and $N_e/2$ is the number of sampling points in an interference half period of $X_{i+1}$. Thus, the optical frequency value $f_k$ (where k=1, 2, 3 ... m+1) of the secondary optical frequency references is obtained:

$$\begin{cases} f_1 = F_i + \frac{F_{i+1} - F_i}{n_{T/2}} \cdot \frac{\Delta n_s}{N_s/2} \\ f_k = f_{k-1} + \frac{F_{i+1} - F_i}{n_{T/2}}, & 2 \le k \le m; \\ f_{m+1} = f_m + \frac{F_{i+1} - F_i}{n_{T/2}} \cdot \frac{\Delta n_e}{N_e/2} \end{cases}$$

In this case, by using the primary optical frequency references provided by the optical fiber F-P etalon and the secondary optical frequency references provided by the optical fiber assisted interferometer, establishing a sampling point-optical frequency curve in the region $E_i$ by interpolation method, so that more real details of the scanning nonlinear curve of the tunable filter during the wavelength scanning process are reflected and the fluctuation in the result of demodulation is suppressed; when it is necessary to further zoom the optical frequency, the phase relationship between points of the signal is obtained according to the two-beam interference characteristic of the signal from the assisted interferometer, so that more secondary optical frequency references are obtained;

by performing peak detection on the reflection spectral line of the FBG sensors, positioning the peak positions into a specified region divided by adjacent transmission spectral lines of the optical fiber F-P etalon; in this region, obtaining the peak central optical frequency $f_{fbg}$ of the FBG sensors by interpolation based on the sampling point-optical frequency curve of the F-P etalon and the assisted interferometer, and obtaining the peak central wavelength $\lambda_{fbg}$ of the FBG sensors by a relationship between the optical frequency and the wavelength; extracting the maximum absorption peak of the transmission spectral line of the optical fiber gas cell, removing the baseline so as to obtain the position of peaks by peak detection; positioning the peaks into a specified region divided by adjacent transmission spectral lines of the optical fiber F-P etalon; obtaining the central optical frequency $f_g$ of the maximum absorption peak of the optical fiber gas cell by interpolation based on the sampling point-optical frequency curve of the F-P etalon and the assisted interferometer; and obtaining the peak central wavelength $\lambda_g$ of the optical fiber gas cell by a relationship between the optical frequency and the wavelength; and, performing temperature shift correction according to the standard value of the central wavelength of the maximum absorption peak of the transmission spectral line of the gas cell to obtain a final demodulated wavelength value.

Figure 2:
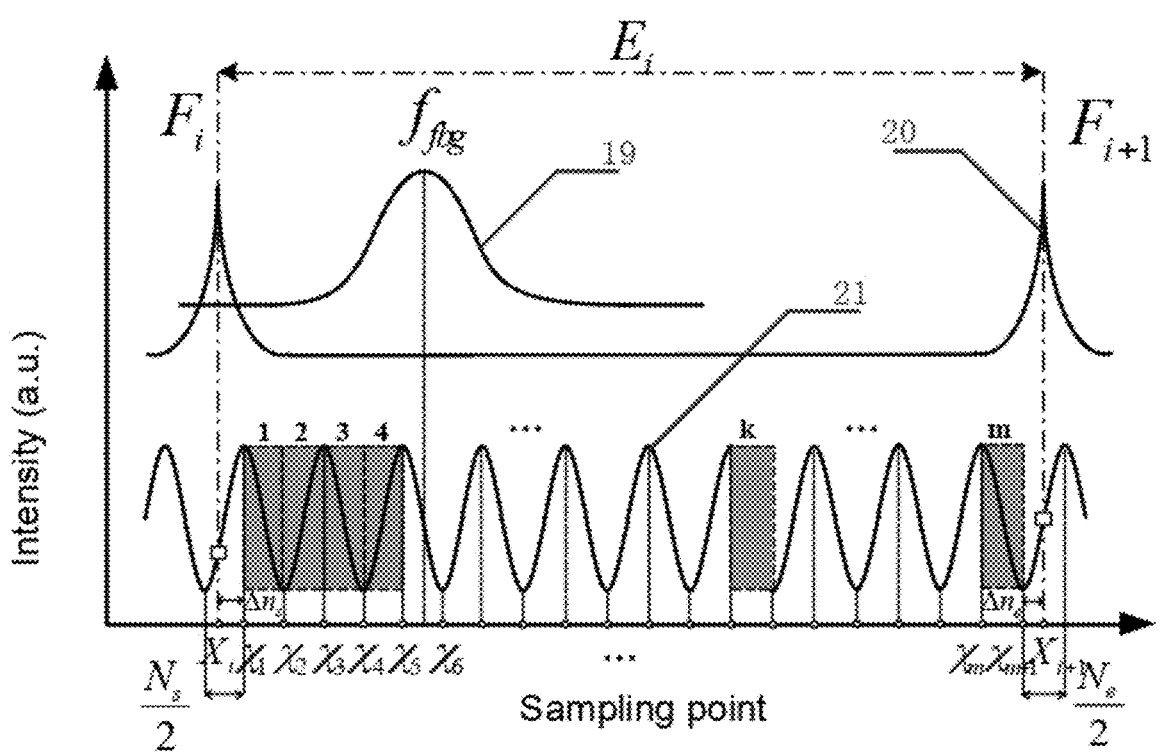
FIG. 2 is a schematic diagram of introducing, by an optical fiber assisted interferometer, additional optical frequency references in an F-P etalon and extracting optical frequencies.

As shown in FIG. 2, in the schematic diagram of introducing, by the optical fiber assisted interferometer 13, additional local optical frequency references between adjacent maximum interference values of the optical fiber F-P etalon, peaks of the FBG transmitted signals 20 are detected and positioned into a region $E_i$ (i=1, 2, 3 ... n−1) determined by a specified etalon transmission peak 19, where n represents the total number of obtained regions. The starting point and ending point of each region are two adjacent peak points $(X_i, F_i)$, $(X_{i+1}, F_{i+1})$ of the optical fiber F-P etalon.

Figure 3:
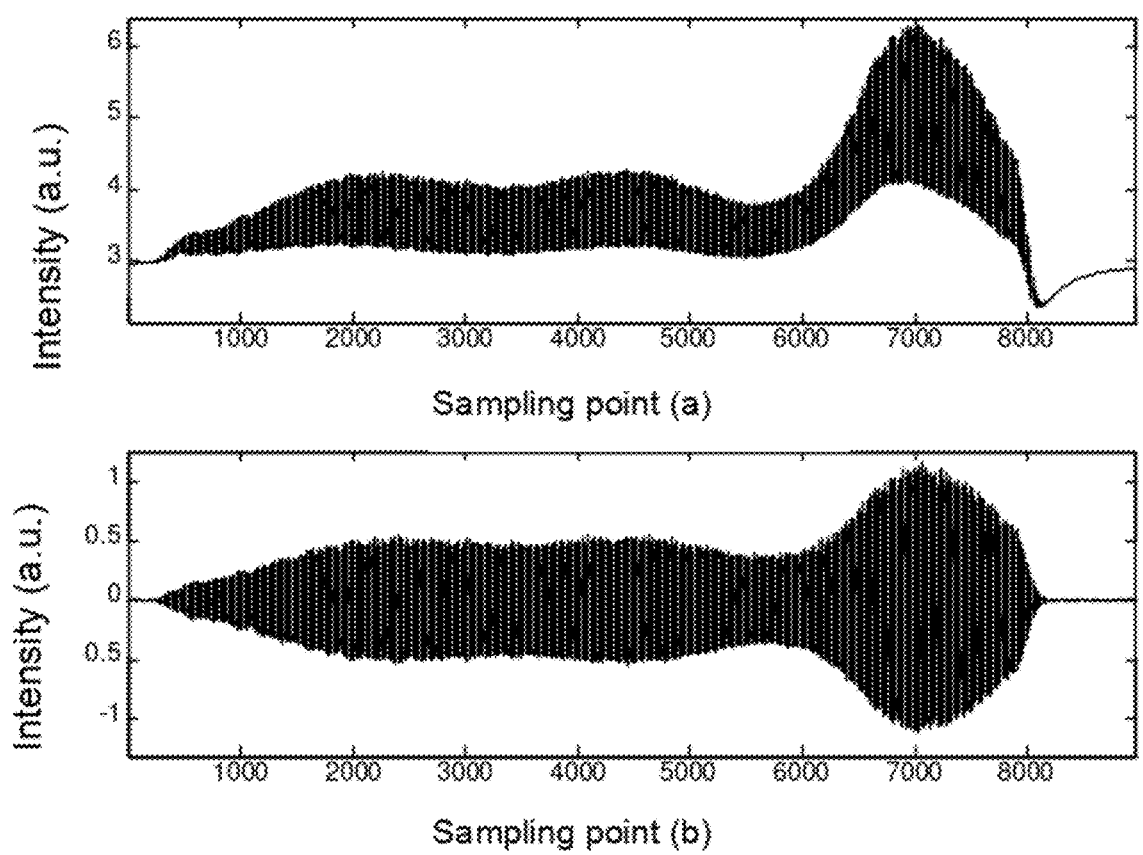
FIG. 3 is a spectrum diagram of the optical fiber assisted interferometer before and after a baseline is removed from an interference spectrum.

As shown in FIG. 3, in the spectra of the signals from the optical fiber assisted interferometer before and after the baseline is removed, for a signal spectral line 21 of the optical fiber assisted interferometer in a region (as shown in FIG. 2), the positions of peaks and troughs are determined by a centroid method to obtain a sampling point sequence $(X_1, \ldots, X_{m-1})$ of secondary optical frequency references. Meanwhile, the number of complete half periods is obtained by counting the number of peaks and troughs, and the number of incomplete half periods close to the starting point and the ending point of the region is determined by calculating the percentage of the incomplete half periods in the half periods. Thus, the number of half periods of interference signals in the region is eventually obtained. Each secondary optical frequency reference value is obtained according to the optical frequency value of the primary optical frequency references at two ends.

Figure 4:
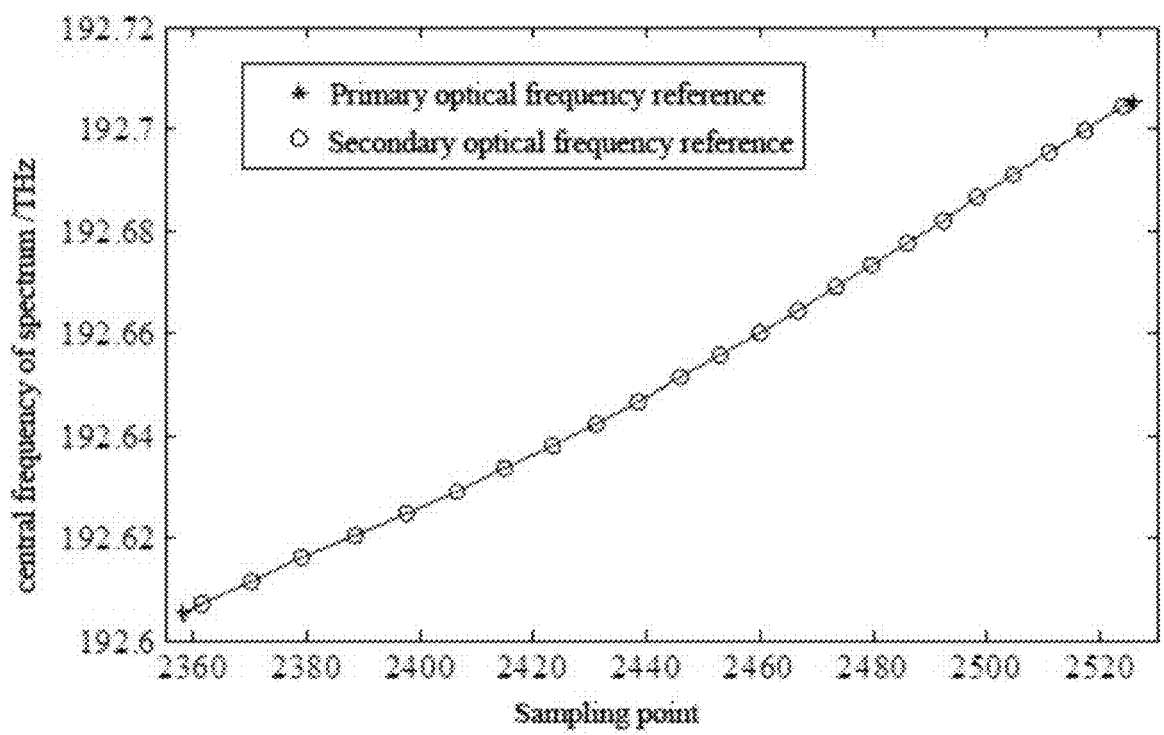
FIG. 4 is a local nonlinear curve of a tunable F-P filter calibrated in combination with the additional optical frequency references.

As shown in FIG. 4, a function relationship of a sampling point-optical frequency curve in the region established by interpolation by using the primary optical frequency references provided by the optical fiber F-P etalon and the secondary optical frequency references provided by the optical fiber assisted interferometer, the peak central optical frequency $f_{fbg}$ of the FBG sensors is obtained according to this relationship, and the peak central wavelength $\lambda_{fbg}$ of the FBG sensors is obtained according to a relationship between the optical frequency and the wavelength. Similarly, the peak central wavelength $\lambda_g$ of the maximum absorption peak of the optical fiber gas cell is obtained. Since the standard value of the central wavelength of the maximum absorption peak of the gas cell is $\lambda_r$, the central wavelength of the FBG after the temperature shift correction is $\lambda_{FBG} = \lambda_f - \eta(\lambda_g - \lambda_r)$, where $$\eta = \frac{m_1 \cdot FSR}{m_1 \cdot FSR + (\lambda_f - \lambda_g)},$$

$m_1$ is the interference order of the transmission peak of the optical fiber F-P etalon closest to the standard value $\lambda_r$ of the central wavelength of the maximum absorption peak of the optical fiber gas cell, and FSR is the free spectral range of the optical fiber F-P etalon.

Figure 5:
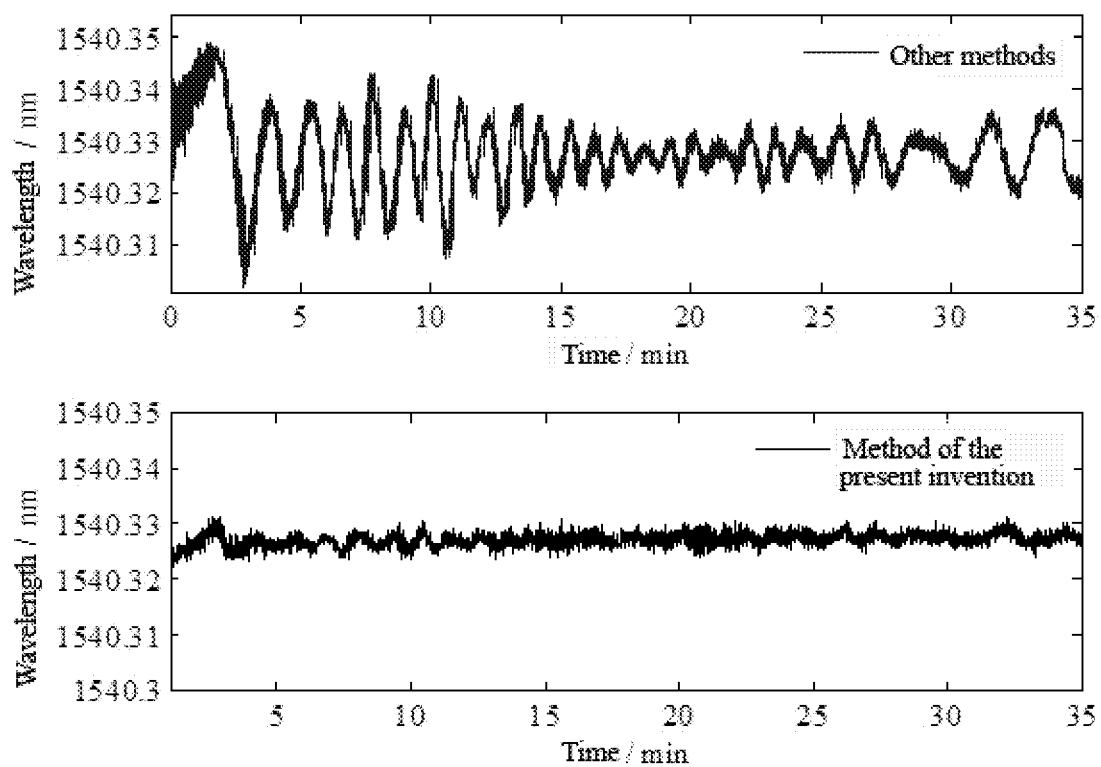
FIG. 5 is a schematic diagram of a rapid temperature changing process of the device of the present invention at the temperature within the ranges from −20° C. to 20° C. in comparison with the result of wavelength demodulation by the demodulation method without introducing any additional optical frequency reference.

As shown in FIG. 5, to verify the improvement effect of the present invention on the wavelength stability of the proposed sensing system, the device is placed at a variable temperature ranges from −20° C. to 20° C., and the FBG sensors insulated in a thermostatic tank by the additional local optical frequency reference method of the present invention; and, the results are compared with that of other methods. It can be seen that, the fluctuation in the result of wavelength demodulation is ±24 pm when adopting other methods; and the fluctuation in the result of wavelength demodulation obtained by the additional local optical frequency reference method of the present invention is ±3.5 pm, so that the stability of wavelength demodulation is improved by 5.9 times.

What is claimed is:

1. A FBG demodulation method for suppressing fluctuation in wavelength demodulation due to rapid environmental temperature changes, comprising following steps:
   (1) performing optical attenuation and optical power tuning and filtering on input signals from a broadband light source to output narrow band swept frequency lasers, isolating and echoing the swept frequency lasers for optical power amplification to output amplified light, and splitting the amplified light into two paths of light: a first path of light going to a sensor link, which further splits into one beam that goes to an optical fiber gas cell and a plurality of beam Ns to obtain reflected light signals which are further converted into analog voltage signals, and a second path of light going to a reference link of local optical frequency;
   (2) splitting the light of the second path into a path A of light and a path B of light, wherein the light of path A forms a comb-like transmitted light, with a specified optical frequency of the transmitted light signals being notched as optical frequency mark, and the light of path B is split and reflected, which is then allowed to encounter and interfere to obtain assisted interference signals; and the comb-like transmitted light of path A and the assisted interference signals of path B are converted into analog voltage signals and demodulated via a data acquisition card and a processing unit to result in a comb-like transmitted light spectral line of path A and an interference signal spectral line of path B, respectively;
   (3) performing peak detection on the comb-like transmitted light spectral line of path A to obtain a primary optical frequency reference point sequence;
   (4) removing baseline from the interference signal spectral line of path B to obtain a secondary optical frequency reference point sequence;

(5) performing peak detection on the reflected light signals of beam Ns of the first path from the sensor link to obtain positions of transmission peaks of FBG sensors, locating the positions in a specified region on the comb-like transmitted light spectral line of path A, and then obtaining a central optical frequency $f_{fbg}$ and corresponding central wavelength $\lambda_{fi}$ of transmission peaks of FBG sensors by interpolation based on the primary optical frequency reference point sequence and the secondary optical frequency reference point sequence obtained in step (3) and step(4), respectively; and (6) performing peak detection on a transmission spectral line of the optical fiber gas cell of the first path to obtain positions of transmission peaks of the optical fiber gas cell, locating the positions in a specified region on the comb-like transmitted light spectral line of path A, and then obtaining a central optical frequency $f_g$ and corresponding central wavelength $\lambda_g$ of the optical fiber gas cell by interpolation based on the primary optical frequency reference point sequence and the secondary optical frequency reference point sequence obtained in step (3) and step(4), respectively; and obtaining a final demodulated wavelength value based on a standard value of the central wavelength of the spectral line of the optical fiber gas cell.

\* \* \* \* \*